United States Patent Office 2,837,488
Patented June 3, 1958

2,837,488

PREPARATION OF CATION-EXCHANGE RESINS CONTAINING HYDROXYL AND PHOSPHONIC ACID GROUPS

Arthur F. Ferris, Huntsville, Ala., assignor to Rohm & Haas Company, Philadelphia, Pa., a corporation of Delaware No Drawing. Application June 10, 1954
Serial No. 435,941

10 Claims. (Cl. 260—2.2)

This invention relates to cation-exchange resins which contain α-hydroxy-phosphonic acid groups as their polar, functional, cation-adsorbing groups. It also relates to the preparation of such cation-exchange resins.

By virtue of the presence of the α-hydroxyl groups in addition to the phosphonic acid groups, the resins of this invention are more strongly acidic than resins containing only phosphonic acid groups. Also, they can be readily and efficiently regenerated by means of dilute solutions of inorganic acids or inorganic salts.

The products of this invention are made by first reacting phosphorus trichloride and acetic acid with an insoluble, cross-linked copolymer of a ketone of the formula

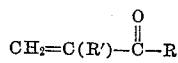

in which R is a hydrocarbon radical and R' is a hydrogen atom or a methyl group, and a copolymerizable polyvinylidene compound which contains two or more vinylidene groups, $CH_2=C<$, and which, therefore, serves as a cross-linking agent, and thereafter hydrolyzing the resultant phosphorus-containing copolymer. While the mechanism of the reaction is not fully understood, it can be represented as follows, wherein $R_2-C=O$ represents the cross-linked, resinous, copolymer containing keto groups:

The resinous, cross-linked copolymers, which are thus reacted and converted into cation-exchange resins are made by copolymerizing a ketone containing a vinyl or isopropenyl group with a polyvinylidene cross-linking agent by addition polymerization in the presence of a free-radical catalyst. While the copolymer can be made in bulk and later comminuted to small particles, it is much preferred to prepare the copolymer in the form of spheroids or beads by emulsion or suspension polymerization.

The operable vinyl or isopropenyl ketones, as shown above have the general formula

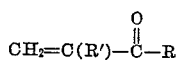

in which R' is a hydrogen atom or a methyl group and R is a hydrocarbon radical such as an alkyl, aryl, cycloalkyl, aralkyl, or an alkaryl group typified by the following radicals: methyl, ethyl, isopropyl, n-butyl, sec-butyl, tert-butyl, iso-butyl, n-octyl, 2-ethylhexyl, cyclohexyl, phenyl, benzyl, tolyl, phenethyl and the homologues and isomers of the same. Actually, because it is desirable to produce resins having the highest possible capacity, and because the capacities of the resins are inversely proportional to the molecular weight of the segmers and hence the size of the group R, it is preferred that R represents a lower alkyl group such as a methyl or ethyl group.

In a similar way, the polyvinylidene cross-linking agent per se contributes nothing to the capacity of the resins but does have a real effect on the density, the latter being directly proportional to the amount of cross-linker. Consequently, while the vinyl or isopropenyl ketone and the cross-linking agent can be copolymerized in all proportions, it is definitely preferred that the latter constitute from about 0.5% to about 12% by weight of the copolymer.

Copolymerizable cross-linking agents containing a plurality of vinylidene groups, $CH_2=CV<$, are well known and are typified by the following: divinylbenzene, divinyl toluenes, divinyl naphthalenes, divinyl ethylbenzenes, divinyl xylenes, ethylene glycol diacrylate, ethylene glycol dimethacrylate, diallyl maleate, divinyl ether, divinyl cellosolve and the like. Divinyl hydrocarbons constitute a preferred class of cross-linking agent, and of these, divinylbenzene is currently most preferred because of its availability, its ease of copolymerization, and its efficiency as a cross-linker.

Copolymerization of the vinyl or isopropenyl ketone and the polyvinylidene compound is accelerated by the use of heat, ultraviolet light and free radical catalysts. The following are typical of suitable catalysts: α,α'-bis-azoisobutyronitrile, methyl azoisobutyrate, benzoyl peroxide, acetyl peroxide, lauroyl peroxide, tert-butyl hydroperoxide, di-tert-butyl peroxide, tert-butyl perbenzoate, stearoyl peroxide, ascaridol, cumene hydroperoxide and "per salts" such as ammonium persulfate and ammonium perborate. The catalysts are used in amount from 0.01% to 5%, and preferably from 0.2% to 2% based on the weight of the polymerizable compounds.

Prior to the reaction with phosphorus trichloride and acetic acid, it is recommended that the particles of cross-linked copolymer be swollen with an organic liquid such as a chlorinated hydrocarbon, exemplified by ethylene dichloride, or an aromatic hydrocarbon, exemplified by toluene. Swollen particles react more rapidly and uniformly than do hard, dense particles.

Although the swollen particles can be suspended in glacial acetic acid alone and then treated with phosphorus trichloride, it is much preferred to employ an organic liquid in addition to the acetic acid. Ethylene dichloride is particularly suitable for this purpose but other liquids which are chemically inert under the conditions of reaction can be used, including carbon tetrachloride, perchloroethylene, benzene, toluene and xylene.

Ordinarily the reaction is carried out at a temperature from about 20° C. to about 50° C., although temperatures from —5° to about 100° C. have been used. At temperatures below room temperature the rate of reaction is unnecessarily slow while at temperatures above about 50° C. objectionable side reaction between the phosphorus trichloride and acid may take place.

The phosphorus trichloride should be present in a ratio of at least one mole for each mole of copolymerized ketone in the cross-linked resin. Actually it is preferred to employ an excess of the phosphorus compound in the order of 10–30%.

A minimum ratio of the acetic acid to phosphorus trichloride of three moles of the former to one of the latter is called for; but, as indicated above a much greater amount of the acid can be present if desired since it can be recovered and re-used.

The phosphorus trichloride and acetic acid can both be present from the beginning of the reaction. Or the halide can be reacted for a while first with the phosphorus trichloride followed by the addition of the acetic acid. The extent of the reaction, like most reactions, depends upon the temperature and time of reaction and is directly proportional to both. And while it is most desirable to react all of the keto groups in the resin in order to obtain maximum cation-adsorbing capacity, this cannot ordinarily be done due to the fact that the reaction mixture is not homogeneous and because the resin is in the form of discrete granules or spheroids. It has been found, however, that a resin, containing as much as 10% cross-linker, and having one-third—or preferably one-half—of the keto groups converted to α-hydroxy-phosphonic acid groups has a sufficiently high cation-adsorbing capacity to be useful in ion-exchange operations on a commercial scale. That is to say, a cation-exchange resin containing at least one α-hydroxy-phosphonic acid group for every three keto groups in the copolymer has a cation-exchange capacity in the range required in commercial operation. When the requirements of capacity are not so high, a resin with fewer hydroxy-phosphonic acid groups suffices.

After reaction with the phosphorus trichloride and acetic acid, the organic liquid, if any, is stripped off and the resinous product is hydrolyzed. A particularly good method is to add water to the reaction mixture and steam distill out the organic liquid while at the same time hydrolyzing the resin. Alternatively, the solid particles of resin are separated from the reaction mixture and then hydrolyzed in an alkaline—or preferably acidic—medium.

The particles of resin are then freed of contaminants and are ready for use in ion-exchange operations. The products are cation-exchangers and, when in the acid form, contain the functional groups having this structure:

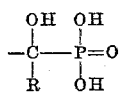

Both of the hydrogen atoms attached to the phosphorus atom are ionizable and hence they can be exchanged for other cations present in solutions which are brought in contact with the resins. Thus the resins are converted to a salt form when they are treated with an aqueous solution of a salt such as sodium chloride or calcium chloride. And they are readily regenerated to the acid or hydrogen form by treatment with a solution of an acid such as hydrochloric acid or sulfuric acid.

The resins of this invention are intermediate in said strength between the well-known weakly basic carboxylic resins on the one hand and the equally well-known sulfonic acid resins on the other. Their characteristic properties result from the particular configuration of the functional α-hydroxy-phosphonic said groups.

The composition of the resins can be varied without departing from the spirit of this invention. Thus, for example other polymerizable vinylidene monomers can be copolymerized with the vinyl or isopropenyl ketone and the polyvinylidene cross-linking agent. For example, well-known monovinylidene compounds, containing a single $CH_2=C<$ group, such as the following can be copolymerized: alkyl esters of acrylic and methacrylic acids; vinyl hydrocarbons such as styrene and vinyl toluene; vinyl esters such as vinyl acetate and vinyl propionate; vinyl halides such as vinyl chloride and vinyl bromide; vinylidene halides such as vinylidene chloride and vinylidene bromide; allyl esters such as diallyl phthalate; and mixtures of the same. In effect, such copolymerized materials are diluents because their presence necessarily reduces the number of keto groups in the cross-linked copolymer and of course reduces the number of α-hydroxy-phosphonic acid groups which can be introduced into the resin. From the standpoint of economy this could well be desirable, always provided, however, that enough keto groups—and later α-hydroxy-phosphonic acid groups—are present to impart the desired cation-exchange capacity for a given purpose.

On the other hand, it is sometimes desirable to copolymerize an additional monovinylidene compound because its presence in the cross-linked resin makes it possible to modify the hydroxy-phosphonic product by the addition of other kinds of cation-adsorbing groups. For example, cation-exchange resins have been made which contain functional, cation-adsorbing groups by copolymerizing esters of acrylic or methacrylic acids together with the vinyl or isopropenyl ketone and cross-linking agent, and thereafter hydrolyzing the ester groups to functional carboxyl groups at the same time that intermediate compound mentioned above is hydrolyzed to form α-hydroxy-phosphonic acid groups. Also, a monovinyl hydrocarbon, such as styrene or vinyl toluene is copolymerized with the vinyl or isopropenyl ketone and cross-linker, and the α-hydroxy-phosphonic acid resin is prepared therefrom in the customary way, after which sulfonic acid groups are introduced into the aromatic nuclei of the resin by reaction of the resin with a sulfonating agent such as chlorosulfonic acid.

The following examples serve to illustrate the preparation of the products of this invention:

*Example 1*

A copolymer of methyl vinyl ketone and divinylbenzene was prepared in the form of small spheroids by the following procedure. Into a reactor equipped with a stirrer, thermometer and reflux condenser was charged 1000 ml. of a 25% aqueous solution of sodium chloride which also contained 2 g. of a commercial dispersing agent of the lignin sulfonate type and 1 g. of dissolved magnesium silicate. Stirring was begun and a mixture was added which contained 247 g. of an azeotropic mixture of 85% methyl vinyl ketone and 15% water, 48.9 g. of commercial divinylbenzene (containing approximately equal parts of divinyl-benzene and ethylstyrene), and 3 g. of α,α'-bis-azobutyronitrile. The stirred mixture was heated to 70° C. in an hour, was held at 70°–75° C. for a period of two hours, and was then heated to 86° C. during a period of one more hour. After cooling, the resultant copolymer, in the form of small spheroids, was separated and thoroughly washed with water. The product, which was obtained in a quantitative yield was dried in an oven for 16 hours at 70° C.

In a reactor equipped with reflux condenser, thermometer, stirrer and cooling means was charged 200 g. of the dried beads of cross-linked copolymer prepared above. Then 1000 ml. of ethylene dichloride was added and the beads were allowed to swell for two hours. Next, 299 g. of phosphorus trichloride was added at such a rate that the temperature did not exceed 35° C. The mixture was stirred at 25–35° C. for 3.5 hours, after which 608 g. of glacial acetic acid was added. Thereafter, the reaction mixture was stirred for 19 hours at 25–27° C. The particles of resin were separated and were mixed with several times their volume of water. This mixture was distilled until no ethylene dichloride appeared in the distillate. The particles of resin were next separated and thoroughly washed with water. The product was tested for cation-adsorbing capacity by treatment with an aqueous solution of sodium chloride and was found to have a capacity of 6.88 milliequivalents (meq.) per gram on the dry basis.

*Example 2*

By the process of Example 1, a copolymer was prepared from a mixture of 92% methyl vinyl ketone and 8% of the same commercial divinylbenzene. The beads of resin were reacted with $PCl_3$ and acetic acid in the same way as is described in Example 1, except that the reaction was continued for a period of 67 hours at room temperature after the acetic acid had been added. The resin was hydrolyzed and isolated in the manner described above. It had a capacity of 7.01 meq./g. dry.

*Example 3*

By the process described in Example 1, a copolymer was prepared from a mixture which contained 90% methyl isopropenyl ketone and 10% of the same commercial divinylbenzene. The beads of resin were treated in the same way as described in Example 1, except that the $PCl_3$ reaction was run at 27–31° C. for 3 hours and the reaction was continued at room temperature for 20 hours after the addition of the acetic acid. The resin was hydrolyzed and isolated in the manner described above and had a capacity of 3.22 meq./g. dry.

*Example 4*

A copolymer was made by the process of Example 1 from a mixture containing 40% methyl vinyl ketone, 40% ethyl acrylate and 20% of the same commercial divinylbenzene. The beads of resin were treated according to the process of Example 1 with $PCl_3$ for 18 hours at 20–35° C. and the reaction was continued for 20 hours after the addition of the acetic acid. The product, worked up and isolated in the manner described above, had a capacity of 3.73 meq./g. dry. It was then hydrolyzed by means of a 10% solution of sodium hydroxide at refluxing temperature for 22 hours. The product was then thoroughly washed. It had a total capacity of 7.36 meq. of calcium per gram dry. The increase in capacity from 3.73 meq./g. to 7.36 meq./g. was due to the functional cation-adsorbing carboxyl groups formed by hydrolysis of the ethyl ester groups.

The resins of this invention possess a type of functional group, i. e., the α-hydroxy-phosphonic acid group, which has not been utilized heretofore in ion-exchange resins. By virtue of their acid strength which is between that of a carboxylic exchanger and a sulfonic exchanger the resins have operational characteristics which fit them for use where neither the carboxylic type nor the sulfonic type has been completely satisfactory heretofore.

I claim:

1. A cation-exchange resin comprising a cross-linked copolymer of a ketone having the formula

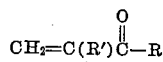

in which R' is a member of the class consisting of a hydrogen atom and a methyl group and R is a monovalent hydrocarbon radical, and a copolymerizable compound which contains a plurality of cross-linking vinylidene groups, $CH_2=C<$, said copolymer containing cation-adsorbing, α-hydroxy-phosphonic acid groups of the formula

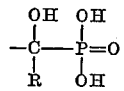

attached to the carbon atoms corresponding to the carbon atom which carries the group, R', in the formula for the ketone above.

2. A cation-exchange resin comprising a cross-linked copolymer of a ketone of the formula

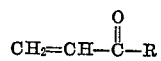

in which R is an alkyl group, and a copolymerizable compound which contains a plurality of cross-linking vinylidene groups, $CH_2=C<$, said copolymer containing cation-adsorbing, α-hydroxy-phosphonic acid groups of the formula

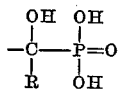

attached to the carbon atoms corresponding to the carbon atom which carries the single hydrogen atom in the formula for the ketone above.

3. A cation-exchange resin comprising a cross-linked copolymer of a ketone of the formula

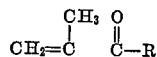

in which R is an alkyl group, and a copolymerizable compound which contains a plurality of cross-linking vinylidene groups, $CH_2=C<$, said copolymer containing cation-adsorbing, α-hydroxy-phosphonic acid groups of the formula

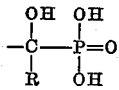

attached to the carbon atoms corresponding to the carbon atom which carries the methyl group in the formula for the ketone above.

4. A cation-exchange resin comprising a cross-linked copolymer of methyl vinyl ketone,

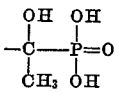

and divinylbenzene, said copolymer containing cation-adsorbing α-hydroxy-phosphonic acid groups of the formula attached to the carbon atoms corresponding to the carbon atom which carries the single hydrogen atom in the formula for the methyl vinyl ketone above.

5. A cation-exchange resin comprising a cross-linked copolymer of methyl isopropenyl ketone,

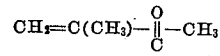

and divinylbenzene, said copolymer containing cation-adsorbing α-hydroxy-phosphonic acid groups of the formula

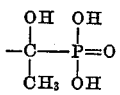

attached to the carbon atoms corresponding to the carbon atom which carries the methyl group in the formula for the methyl isopropenyl ketone above.

6. A process for preparing cation-exchange resins containing α-hydroxyphosphonic acid functional groups which comprises reacting at a temperature of from —5° C. to about 100° C. a cross-linked copolymer of a ketone having the formula

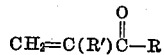

in which R' is a member of the class consisting of a hydrogen atom and a methyl group, and R is a monovalent hydrocarbon radical, and a copolymerizable compound which contains a plurality of cross-linking vinylidene groups, $CH_2=C<$, with phosphorus trichloride and acetic acid and thereafter hydrolyzing the resultant product.

7. A process for preparing cation-exchange resins containing α-hydroxyphosphonic acid functional groups which comprises reacting at a temperature of from —5° C. to about 100° C. a cross-linked copolymer of the formula

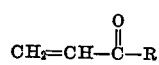

in which R is an alkyl group, and a copolymerizable compound which contains a plurality of cross-linking vinylidene groups, $CH_2=C<$, with phosphorus trichloride and acetic acid and thereafter hydrolyzing the resultant product.

8. A process for preparing cation-exchange resins containing α-hydroxyphosphonic acid functional groups which comprises reacting at a temperature of from —5° C. to about 100° C. a cross-linked copolymer of the formula

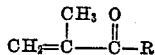

in which R is an alkyl group, and a copolymerizable compound which contains a plurality of cross-linking vinylidene groups, $CH_2=C<$, with phosphorus trichloride and acetic acid and thereafter hydrolyzing the resultant product.

9. A process for preparing cation-exchange resins containing α-hydroxyphosphonic acid functional groups which comprises reacting at a temperature of from —5°

C. to about 100° C. a cross-linked copolymer of methyl vinyl ketone and divinylbenzene with phosphorus trichloride and acetic acid and thereafter hydrolyzing the resultant product.

10. A process for preparing cation-exchange resins containing α-hydroxyphosphonic acid functional groups which comprises reacting at a temperature of from −5° C. to about 100° C. a cross-linked copolymer of methyl isopropenyl ketone and divinylbenzene with phosphorus trichloride and acetic acid and thereafter hydrolyzing the resultant product.

References Cited in the file of this patent

UNITED STATES PATENTS

| 1,937,063 | Meisenburg et al. | Nov. 28, 1953 |
| 2,694,684 | Rogers et al. | Nov. 16, 1954 |

OTHER REFERENCES

Bregman et al., Journal Amer. Chem. Soc., vol. 74, April 5, 1952, pp. 1867 and 1868.

Bregman, Ann. N. Y. Acad. of Science, vol. 57, Art. 3, pages 125–143, Nov. 11, 1953.

UNITED STATES PATENT OFFICE
Certificate of Correction

Patent No. 2,837,488 June 3, 1958

Arthur F. Ferris

It is hereby certified that error appears in the printed specification of the above numbered patent requiring correction and that the said Letters Patent should read as corrected below.

Column 5, lines 70 to 72, claim 3, the formula should read as shown below instead of as in the patent—

column 6, lines 12 to 15, claim 4, the formula should appear as shown below instead of as in the patent—

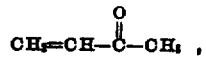

same column, same claim, after the word "formula" in line 17, and before the word "attached" in line 18, insert the following formula—

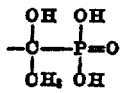

Signed and sealed this 22nd day of July 1958.

[SEAL]

Attest:
KARL H. AXLINE,
*Attesting Officer.*

ROBERT C. WATSON,
*Commissioner of Patents.*